United States Patent [19]

Shepard

[11] Patent Number: 5,696,854
[45] Date of Patent: Dec. 9, 1997

[54] BATCHED CHARACTER IMAGE PROCESSING

[75] Inventor: David H. Shepard, Coronado, Calif.

[73] Assignee: Cognitronics Imaging System, Inc., San Diego, Calif.

[21] Appl. No.: 477,921

[22] Filed: Jun. 7, 1995

Related U.S. Application Data

[62] Division of Ser. No. 97,131, Jul. 26, 1993, Pat. No. 5,526,447.

[51] Int. Cl.$^6$ ............................................. G06K 9/03
[52] U.S. Cl. ............................................. 382/311
[58] Field of Search .................... 382/309–311, 173, 382/177–179, 100, 229, 317

[56] References Cited

U.S. PATENT DOCUMENTS 5,282,267  1/1994  Woo, Jr. et al. .................... 395/157

*Primary Examiner*—Joseph Mancuso
*Assistant Examiner*—Gerard Del Rosso
*Attorney, Agent, or Firm*—Parmelee & Bollinger, LLP

[57] ABSTRACT

Character recognition processing wherein each of a batch of documents is scanned to produce corresponding scan data signals forming a rectilinear data array of binary bits at the intersections of a rectangular coordinate grid. These signals are stored and processed by a recognition algorithm to produce identity signals for recognized characters. Groups of non-recognized characters are presented simultaneously to permit rapid identification by inspection. The identification of recognized characters is verified at high speed by simultaneously presenting the character images as respective groups sorted to have the same recognized identities.

6 Claims, 4 Drawing Sheets

FIG. 2

| 9 | 5 | 9 | 2 | V | 6 | 9 | 9 | 0 | 7 |

CHARACTERS ARE:

FIG. 3

| 9 | 5 | 9 | 2 | V | 6 | 9 | 9 | 0 | 7 |

CHARACTERS ARE: 9 5 9 2 V 6 9 9 0 7

BATCHED CHARACTER IMAGE PROCESSING

This application is a divisional application of application Ser. No. 08/097,131 as originally filed on Jul. 26, 1993 now U.S. Pat. No. 5,526,447.

BACKGROUND OF THE INVENTION

1. Field of the Invention

This invention relates to character recognition systems and procedures. More particularly, this invention relates to processing groups of character-bearing documents by intelligent character recognition (ICR) techniques.

2. Description of the Prior Art

Characters on documents such as forms to be filled in with hand-printed characters are now commonly read automatically by character recognition apparatus, of which there is a considerable variety. In such apparatus, the documents generally are scanned by radiant energy such as visible light or infra-red wavelengths, arranged for example to develop a series of closely-spaced parallel scan lines and to produce scan signals for closely-spaced spots along each line. The resulting scan data signals typically form a rectilinear data array of binary bits at the intersections of a rectangular coordinate grid.

These scan data signals are stored and analyzed in accordance with a recognition algorithm. Before the algorithm is applied, the character images normally are put through a "segmentation" process, to assure separation, and then are "boxed" for recognition processing. Recognition algorithms have become highly refined, so that a large proportion of the scanned characters will be correctly recognized. Nonetheless, there will be characters which the algorithm cannot recognize, or may identify incorrectly, and for most applications it becomes necessary to carry out supplementary procedures to complete the processing.

Conventionally, to determine the identity of a character which failed to be recognized algorithmically, the image of a substantial area of text or an entire field on a business form containing such character will be displayed on a CRT for inspection by an operator. This large area display enables the keying operator to be more certain of character identity than by displaying just a rejected character image, especially where segmentation may not have been performed correctly due to printing problems or other causes.

Such supplementary procedures take considerable time. For example, when fields and other large areas are displayed one at a time with isolated character rejects, an operator rarely exceeds keying one character every two seconds. A considerably greater speed of keying and correcting character identities is badly needed for high volume document processing.

SUMMARY OF THE INVENTION

In accordance with the invention, initially-rejected or incorrectly-identified characters are recognized by an operator at considerably greater speeds than heretofore. In one preferred embodiment of the invention, to be described hereinafter in detail, this is achieved by storing images of individual characters taken from a large group of documents being processed. These character images are displayed batched in reorganized format for simultaneous inspection by the operator. The overall speed of operator recognition and reject keying, and also of data verification, can, by such technique be increased by large factors, e.g., a factor of five improvement for reject keying, and a factor of ten improvement for character identity verification. The use of data bases in combination with such batched character image processing can further reduce operator keying by resolving character recognition uncertainties through context.

Other objects, aspects and advantages of the invention will in part be pointed out in, and in part apparent from, the following description considered together with the accompanying drawings.

BRIEF DESCRIPTION OF THE DRAWINGS

FIG. 2 shows an example of a CRT image display at the start of operator processing of a batch of rejected characters;

FIG. 3 is like FIG. 2, but shows the identified characters as entered by the operator;

FIG. 4 shows an example of a CRT image display of a group of sorted same-character images during verification processing by an operator;

FIG. 5 shows a CRT display presenting portions of two groups of sorted characters; and FIG. 6 shows a single character from FIG. 4, with an operator-entered correction.

DESCRIPTION OF A PREFERRED EMBODIMENT

Referring first to FIG. 1, at the upper left-hand corner is shown a batch of documents 10 such as business forms which are to be scanned as part of the process for machine recognition of characters on the documents. To the right of the documents is illustrated in general outline a scanner 12 which may, for example, be similar to that shown in U.S. Pat. No. 4,760,246 issued to D. H. Shepard on Jul. 26, 1988. That scanner employs a linear array sensor to detect the amount of radiation reflected from closely-spaced spots along a scan line across a document in the scanner. As the document is advanced through the scanner, the sensor develops such scan data signals for a series of closely-spaced scan lines, e.g. about 0.008" apart. These signals are read out sequentially by conventional electronic means and stored.

Associated with the scanner 12 is a data processor, as generally indicated at 20, preferably a conventional PC having the usual data entry keyboard for an operator. This PC has substantial memory capacity, and includes software routines which establish files and order the processing of the data as will be described. At the start, the operator keys in a batch number to identify the group of documents to be processed. The scan data signals from the documents may initially be compressed to reduce storage requirements, and then are stored in a memory file referred to in FIG. 1 as the SWF File.

Figure 1A:
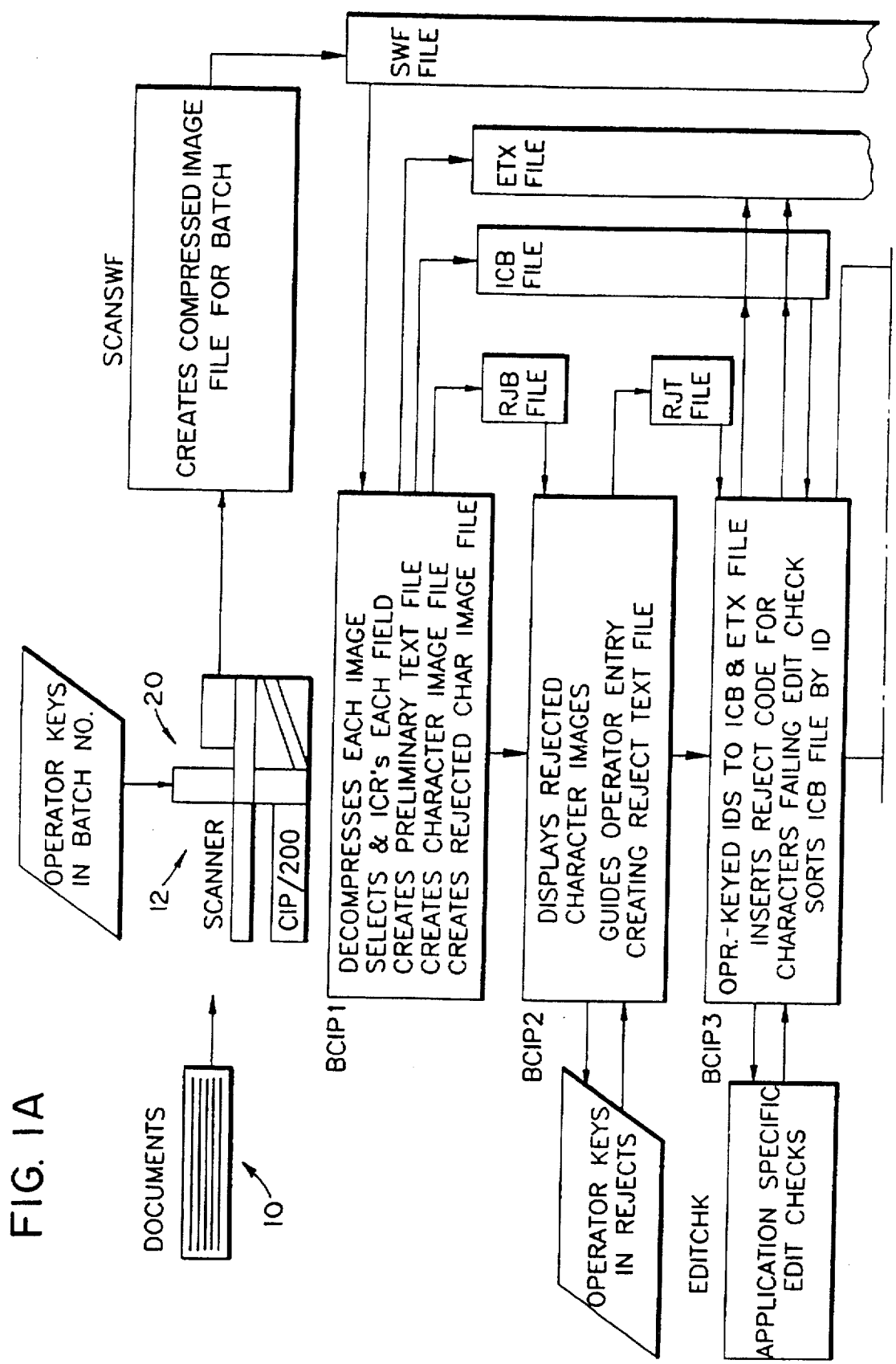
FIGS. 1A and 1B together form a flow diagram showing operations involved in analyzing the character scan data to determine the identity of algorithmically unrecognized characters and to verify the accuracy of recognized characters.
Figure 1B:
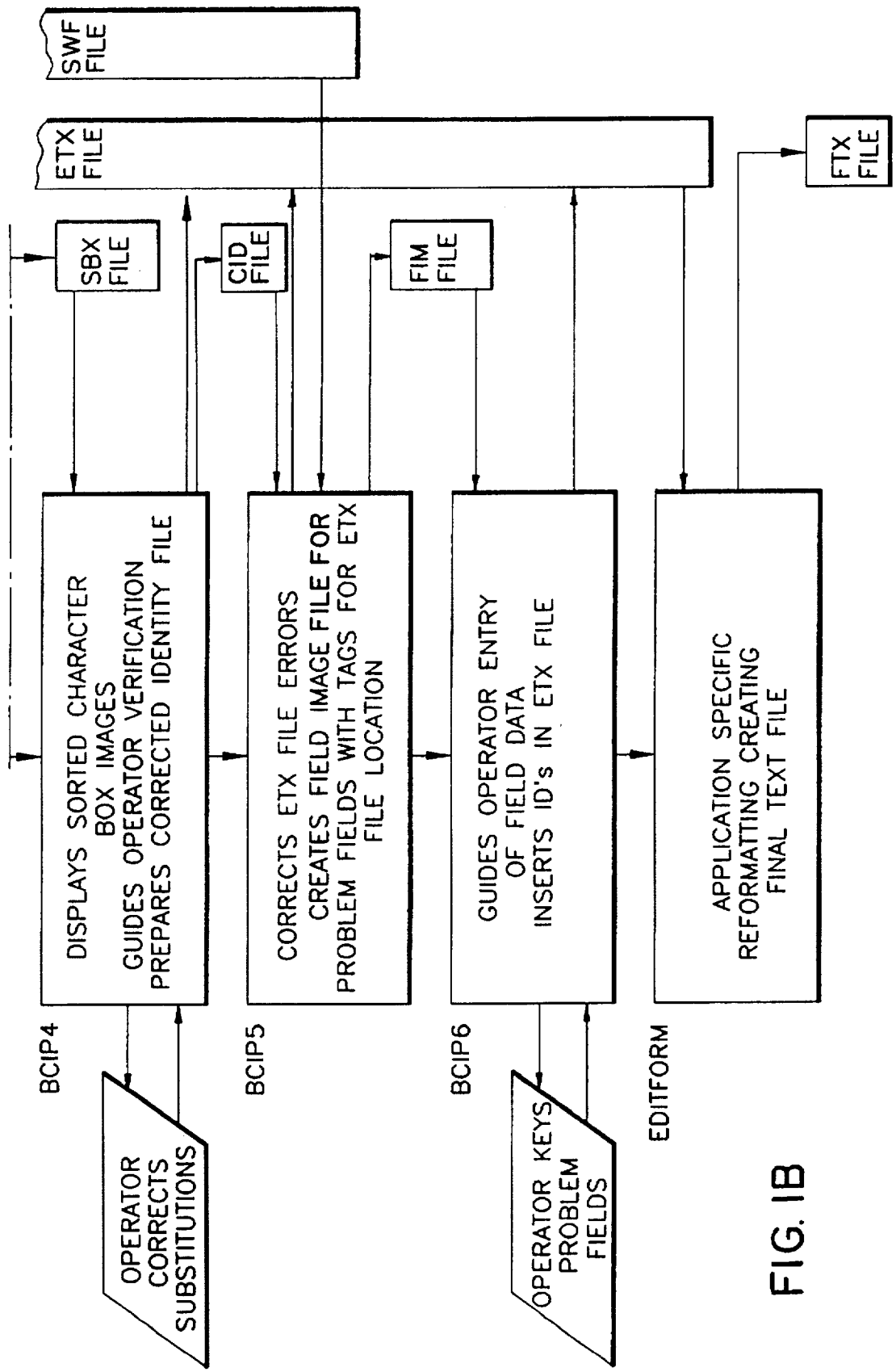

FIGS. 1A and 1B outline the processing procedures by means of a series of function blocks BCIP1, 2, etc. (where BCIP stands for Batched Character Image Processing). These blocks contain descriptive statements explaining the actions performed during the corresponding segment of the program. The sequence of action proceeds downwards through the series of blocks. The files established in the PC memory are identified to the right of the BCIP blocks, and operator actions and other procedures are described to the left of the blocks.

Scanning of the documents 10 by the scanner 12 can be carried out while the operator is working on the processing of the scan data from a previously-scanned batch of documents. A typical scanner used in image storage and character recognition work may scan and store document images at the rate of about one document per second. Character recognition of complete document images also may typically proceed at the rate of about one document per second, although this will vary with document content and recognition algorithms used.

In a presently preferred embodiment of this invention, a few hundred documents are processed at a time, with the scan data signals for the entire batch being stored in a single file. Storing this much data permits an operator to start a batch of documents into the scanner and then do the reject character entry and/or character verification (to be described) for a previous batch file (SWF File) while the new batch of documents is being scanned. The overall SWF File includes a number of separate files, which can be individually identified such as 0001.SWF, 0002.SWF, etc., to accommodate respective batches of documents.

Turning now to the processing of the scan data signals in the selected SWF File, each document image in that file is accessed and decompressed back to its original format, as indicated in the block at BCIP1. The particular character fields to be processed are predetermined in the usual way, and the characters in that field or fields are "boxed", i.e., the character images are isolated and stored within particular locations in memory. In the preferred process, these boxes are arranged as successive rows of side-by-side images, with each character image being placed in the upper left-hand corner of its box. The document processing preferably is carried out left-to-right, top-to-bottom, although other protocols can be used.

The appropriate recognition algorithm then is applied to each stored character image. A large proportion of the boxed characters will be recognized algorithmically, and codes for those characters are then stored in a Preliminary Output Text File (ETX) for each document. Assuming that a certain number of characters is specified for each field in the output record, as is usually true in form data entry applications, the output record (ETX file) is stored from the start in this format, even if the number of characters seen in the field is less. For example, if the field specified is for the name of the person filling in the form, the number of character slots must be large enough for the longest name expected. For shorter names, space characters are inserted to fill the blanks.

The boxed character images are stored in a file labelled ICB ("identified character boxes"). In the preferred embodiment, each boxed character image is assigned 96 bytes of data, each of 8 bits. The image pixels for the CRT are in the first 93 bytes which define a rectangular array 24 pixels wide and 31 pixels deep for the CRT presentation. Byte 96 carries the character identity, if recognized, and a reject code if it fails recognition to a specified confidence level.

Rejected boxed character images are stored in a file labelled RJB ("rejected box"). As each image is stored, in both the ICB and the RJB files, its box is tagged with the document number (bytes 90, 91) and the character number in the document (bytes 92, 93). (Note: Bytes 90-93 are in the lower right-hand corner of the box, and are almost never useful to the human eye in determining character identity since in the preferred boxing process the characters are shifted as far as possible to the upper left-hand corner in the boxing algorithm used. These pixels, not overwritten at the time of application of the recognition algorithm, need not be displayed for operator use.)

When the RJB file has been completed, the stored images are displayed in batch format on the PC CRT screen as indicated in BCIP2. These characters normally will be grouped together in a constant convenient number, such as ten. An example of such a display is presented in FIG. 2. (Note: If some fields are known to be numeric and others alphabetic, it is generally preferable to produce two separate files for such different types of characters, in order to eliminate confusion, such as between the digit zero and the letter "O".)

The operator examines this display as illustrated in FIG. 2 and, by inspection, determines the identity of each rejected character to the extent possible. These identities then are keyed in by the operator. If the operator cannot identify the character from the image as boxed, the operator keys in a code meaning "I don't know" instead of the identity. The identified characters or "I don't know" code are displayed immediately below the original character image as each is keyed in, as illustrated in FIG. 3. The operator thus can review the assigned identity as it is entered, so as to spot a possible keying error. The operator has another chance for such review at the end of the line before pressing the "enter" button. After this process is completed, the keyed-in operator-determined identities are concatenated in a file labelled RJT ("rejected text").

In BCIP3, the operator-determined identities of the rejected characters are inserted into byte 96 of the corresponding boxed characters in the ICB file for later use in the verification stage. These corrected identities also are collated back from the RJT file into the ETX file for the corresponding characters. The corrected identities are inserted one at a time as the reject codes are encountered in the ETX file.

This latter updating of the ETX file need not make use of the box tag data to determine the insertion point. That is, each ETX text character to be corrected is identifiable by the reject code in place of an identity code. Thus, as each reject code is encountered it is replaced by the next available newly-identified character identity code (or an "I don't know" code) from the RJT file, due to the 1:1 correspondence between the RJT file information and the reject codes in the ETX file.

Application-specific edit checks may be applied to reduce uncertainties. This is shown at the left of BCIP3, but can also be done in BCIP2 before reject character display, so as to reduce reject keying. For example, a data base may be available, such as Zip Code information which can be used to aid in recognition of names in addresses. To illustrate, CORONADO, Calif. has the Zip Code of 92118. If the recognized Zip Code is 92118, and if the recognized city name has eight letters, many of which match the letters of CORONADO, not much chance is taken by filling in the uncertainties or even replacing one or two mismatched characters. When done in BCIP3, rejected characters in "CORONADO", if any, are not displayed in BCIP2 because it is known in BCIP1 that the "city" field is associated with the Zip Code field. In the unusual case of an error after data base match, it will be detected later. Or, if no good match is found, the "I don't know" character may automatically be inserted in the ETX file, resulting in later display of the whole field for keying.

Also in BCIP3, the tagged character images in the ICB file (as corrected by the rejected character sequence described above) are sorted by character identity so as to group together characters having a common identity characterization. Specifically, all numeric zeros are collected together, followed by all numeric ones, and so on. Similarly, all alphabetic "a"s are collected together, followed by all "b"s, and so on. Within each group of common identity characterization, the originally rejected and later key-identified images appear first, followed by the originally recognized characters. These groups of characters are concatenated and placed in a file labeled SBX ("sorted box file"), and in BCIP4 are displayed in group format for examination by the operator. This is illustrated in FIG. 4 for the case of numeric zeros.

Figure 4:
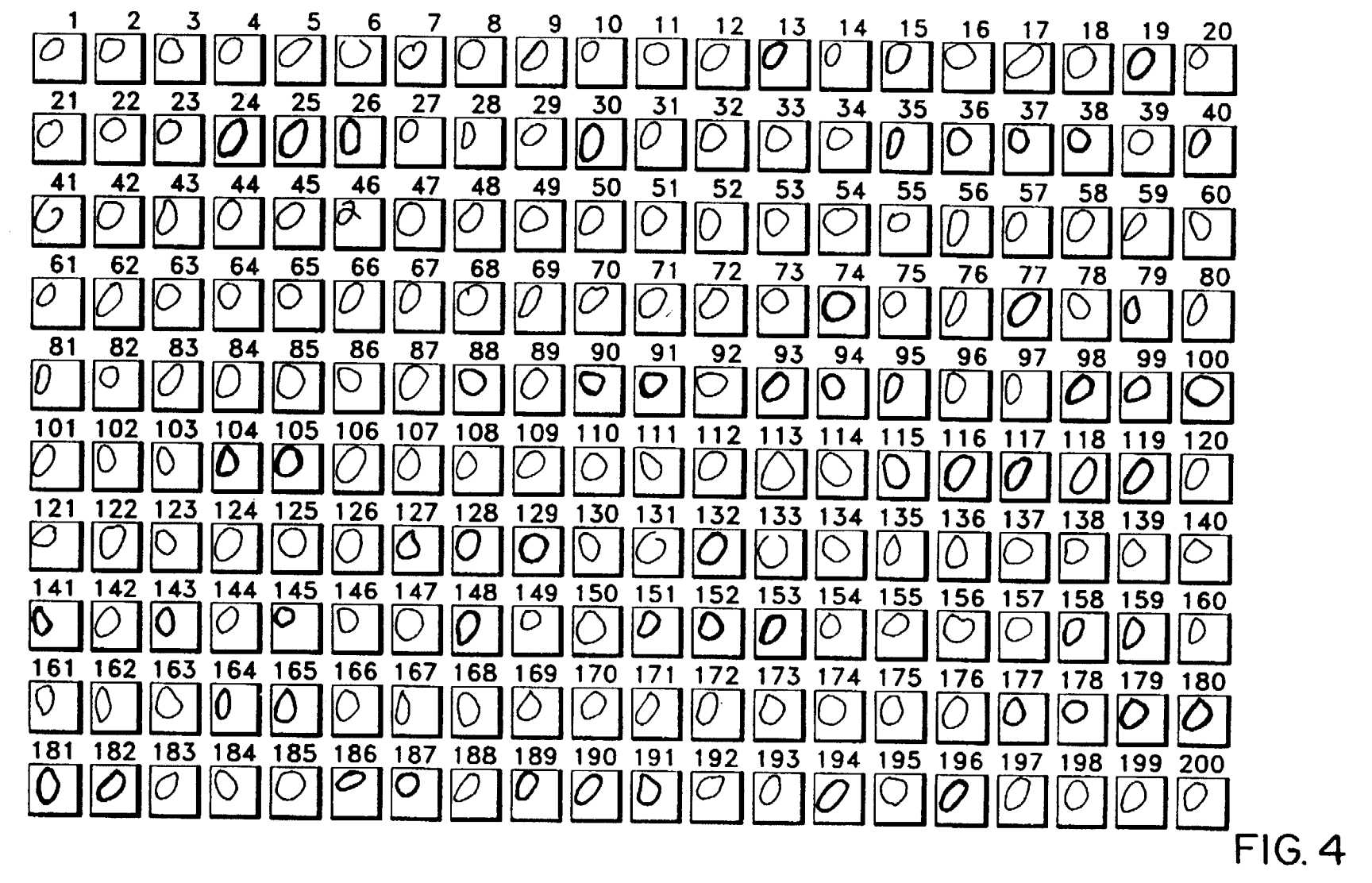

As shown in FIG. 4, it is convenient to present a two-hundred character display on a single screen (e.g., 20 across by 10 down) if the number of characters in the group warrants. The commonly-identified characters are taken from any place on any of the documents, and although presented side-by-side, as shown in FIG. 4, will in almost all cases not be from such adjacent locations on a document. FIG. 5 illustrates the condition where the last line of one group may not fill up one complete line. In that case, the remainder of the last line of that group will be filled with spaces (as shown, from box 31 on), and the next group will be started at the begining of the next line (box 41), to avoid confusion between groups.

The operator can quickly scan a display such as shown in FIG. 4, and can readily spot any character which should not be a member of the group. For example, the verification display for box number 46 in FIG. 4 is illustrated as an imperfect "2". The image shown will be recognized by the operator as a "2", even though incorrectly recognized as a "0" by the algorithm. The operator then will enter through the PC keyboard the screen location number shown with the problem box (No. 46), together with the corrected identity "2".

As shown in FIG. 6, this corrected character then will automatically be presented in the lower right-hand corner of the box, preferably in a different color such as red. If the operator is not sure of the correct identity, the code for "I don't know" will be entered.

The new information entered is placed in the tag for the image box (ICB file) of the corrected character. That is, the new character identity (or the "I don't know" code) will be inserted in byte 96, and such complete 5-byte tags (two for document number, two for character number and one for identity) then are concatenated in a file labelled CID, standing for "corrected identity".

The ETX file now is updated in BCIP5, to correct any errors found in the verification process. For this, the 5-byte tags in the CID file are used to determine the document number and character number within a document to locate the correction points, and the corrected identity code is inserted there in the text. It may be noted that since the verification operation follows the reject entry operation, inadvertent reject keying errors made by the operator will be caught in the verification stage.

As noted above, sometimes characters cannot be determined by the operator, either in the reject entry stage or the verification stage. In that case, the operator will have keyed in the "I don't know" code for byte 96, to be inserted in the ETX file. The image in the SWF file of the document containing such a character is reprocessed in order that the operator may make a decision based on the appearance of each such "I don't know" character in the context of its field. This reprocessing may include re-keying the entire field, for example if the problem arose due to faulty segmentation.

In this BCIP5 reprocessing, the field images (i.e., the scan data for all the characters in the particular field containing the unrecognized character) are extracted from the whole document image using the same algorithm by which the fields were originally isolated for processing, saving the field images in an FIM file ("field image file") whenever the secondary text file (ETX) derived as described above contains the "I don't know" identity code for a character in that field. No character recognition is performed in this pass, and documents which contain no "I don't know" characters are passed over entirely. A tag is attached to the extracted field image in the FIM file indicating what document number in the batch and what starting number within the document applies to that field, as well as carrying along the text currently in the ETX file for that field.

The last operator step, BCIP6, is to review any rejected field images one at a time from the stored displays in the FIM file, to provide corrected identities in the ETX file for the orignally unrecognized characters. After the operator keys in the correction, the computer inserts the corrected field text back into the document number and field starting position in the output record (ETX) indicated by the tag attached to the field image.

In some applications, a document occasionally is in such bad condition that a field on a document appears so far from where expected that some of the data is not entirely within the field image saved. (This can happen, for example, on a torn document which, nevertheless, made it through the scanner.) In this case the entire document image or some other portion larger than a field may be displayed in the BCIP6 operation when the operator encounters this problem, returning to the next stored problem field after resolution of the problem which required further field expansion.

The final version of the ETX file can, where appropriate, become the final text file (FTX) representing the output of the recognition process. However, in some applications it may be necessary first to reformat the output text into a specific order different from the top-to-bottom, left-to-right order in which documents are normally scanned, or reformatting for some other purpose such as abbreviation expansion may be required.

It will be evident that the process of verification described above may be tiring on the eye of the operator, and thus this operation should be interspersed with other work. The operator may nevertheless at times be inattentive to the verification work, and advantageously a safeguard is incorporated in the procedures to allow for detection of such inattention. For that purpose, the software may provide for randomly inserting a small number of incorrectly identified character images in each batch, to gauge operator attention levels.

This can be done by deliberately inserting incorrectly-identified boxed characters, tagged in this case with null location identities. For example, the processing procedures may take every thousandth character image from the ICB file for this purpose, display it once as identified, and deliberately change its identity code in a second display of the same character image. The characters so selected will have come from the same (statistical) character population being processed and thus will not stand out unfairly or be recognized as a bogus character by the operator. The deliberately changed-identity image boxes may for example be interspersed at every 1000th box as the sorting and concatenation into the SBX file takes place. These misidentified characters will appear in totally different and essentially random locations from the operator's point of view in the verification operation to follow because of the changed identities.

When the ETX file ultimately is updated by the corrections from the verification process, the inserted character images with bogus identities and null location tags will not be inserted back into the ETX. Instead, the character identities will be checked to see if the error was corrected, and the results of such checking will be used to develop verification accuracy statistics for operator and/or supervisor review.

Although a preferred embodiment of the invention has been disclosed herein in detail, it is to be understood that this is for the purpose of illustrating the invention, and should not be construed as necessarily limiting the scope of the invention since it is apparent that many changes can be made by those skilled in the art while still practicing the invention claimed herein.

What is claimed is:

1. For use in a process for recognizing characters on a batch of documents wherein at least a portion of a document is scanned to produce and store scan data signals reflecting the presence of character elements at particular positions on the document; the characters represented by said stored scan data signals being initially analyzed by recognition procedures including that of processing the stored character scan data signals by a recognition algorithm to establish initial identifications of the characters;

the method of verifying the identity of characters initially identified by said procedures comprising the following steps:
(1) storing character images with purposely inserted bogus identities to be presented together with initially recognized characters to develop verification accuracy statistics;
(2) sorting the stored initially recognized characters and characters with bogus identities into groups wherein the characters of each group have a common identity characterization;
(3) simultaneously presenting images of a number of characters of at least one of said groups;
(4) determining by inspection the presence of a character in at least one of said presented groups failing to have the identity characterization common to the group to which said character belongs;
(5) determining by inspection the correct identity of a character failing to have the identity characterization common to the group to which said character belongs;
(6) developing a corrected identity signal for such correct identity; and
(7) utilizing said corrected identity signal for an initially-incorrectly-identified character to create at least part of an output text for said batch of documents.

2. For use in a process for recognizing characters on documents wherein at least a portion of a document is scanned to produce and store scan data signals reflecting the presence of character elements at particular positions on the document and presenting the images of the scanned characters on the document; the characters represented by said stored scan data signals being initially analyzed by recognition procedures including that of processing the stored character scan data signals by a recognition algorithm;

the method of verifying the identity of characters initially recognized by said procedures comprising the following steps:
(1) storing with said scan data signals additional data signals representing images of characters with deliberately incorrect identities;
(2) sorting the initially recognized and said additional image data signals into groups with common identity characterizations;
(3) simultaneously displaying images of characters of at least one of said sorted groups;
(4) determining by inspection the presence of characters in one of said displayed groups failing to have the identity characterization common to said one displayed group;
(5) determining by inspection the correct identity of displayed characters failing to have the identity characterization common to said one displayed group; and
(6) developing a corrected identity signal for displayed characters determined in step (5) above.

3. In a method for verifying initially determined identities of characters, the steps of:

storing data representing the images of a number of characters which have been initially identified;

storing data representing the images of characters which are purposely incorrectly identified;

sorting said stored image data into groups of characters of the same identification;

simultaneously displaying a number of character images from a group of the same identification;

finding by inspection the presence of characters in the displayed group failing to have the characterization common to that group; and determining whether characters which were purposely-incorrectly-identified were found in the preceding step.

4. The method of claim 3, wherein purposely-incorrectly-identified characters are taken from the stored character images the identities of which have been initially determined; and including the steps of:

altering the identity assigned to each such taken character; and storing the now incorrectly-identified taken character with other initially-identified character images.

5. The method of claim 3, wherein purposely-incorrectly-identified characters are inserted in a predetermined numerical relationship with respect to the to initially-identified characters.

6. The method of claim 3, including developing verification accuracy statistics based on the results of said step of determining whether purposely-incorrectly-identified characters were found.

* * * * *